United States Patent

[11] 3,561,659

| [72] | Inventor | Jack R. Anthony<br>Borger, Tex. |
|---|---|---|
| [21] | Appl. No. | 738,258 |
| [22] | Filed | June 19, 1968 |
| [45] | Patented | Feb. 9, 1971 |
| [73] | Assignee | Dresser Industries, Inc.,<br>Dallas, Tex.,<br>a corporation of Delaware |

[54] TRANSPORT SYSTEM
1 Claim, 6 Drawing Figs.
[52] U.S. Cl. .................................................. 226/180, 226/187
[51] Int. Cl. .................................................. B65h 17/08
[50] Field of Search .................................................. 226/176, 177, 180, 187, 196, 199

[56] References Cited
UNITED STATES PATENTS
2,071,682  2/1937  Buccicone .................... 226/180
2,461,376  2/1949  Feldmeier .................... 226/180X
3,107,064  10/1963  Price .......................... 226/187X
3,132,787  5/1964  Rayfield ...................... 226/176

*Primary Examiner*—Richard A. Schacher
*Attorneys*—Robert W. Mayer, Daniel Rubin, Peter J. Murphy, Frank S. Troidl, Roy L. Van Winkle and William E. Johnson, Jr.

ABSTRACT: This disclosure is of a high speed data plotter system. The data plotter system uses modulated laser light to scan photographic film. The system includes means for driving the photographic film, and at least two separate guide rollers which frictionally engage the moving photographic film. The system also includes a rotatable drum and pressure rollers adapted to frictionally engage the photographic film with the rotatable drum so that all slippage is eliminated therebetween throughout any series of rapid incremental motions of the drum. The guide rollers and pressure rollers maintain the fast moving film taut and true in position during the scanning.

INVENTOR
JACK R. ANTHONY

Frank S. Troidl

ATTORNEY

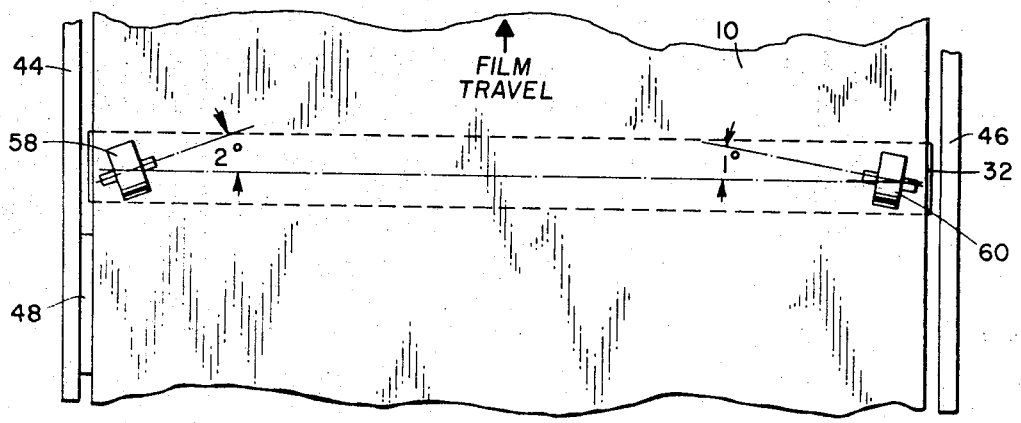
FIG. 3
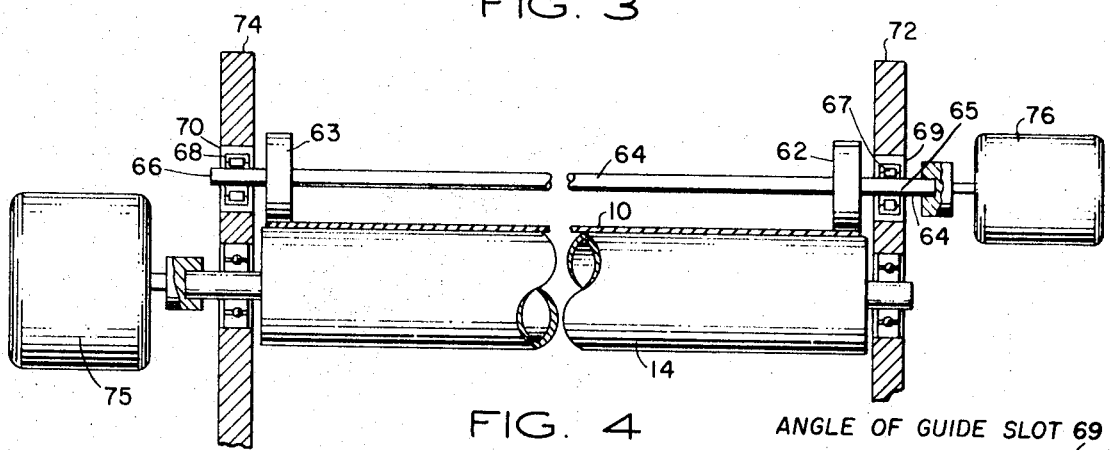
FIG. 4
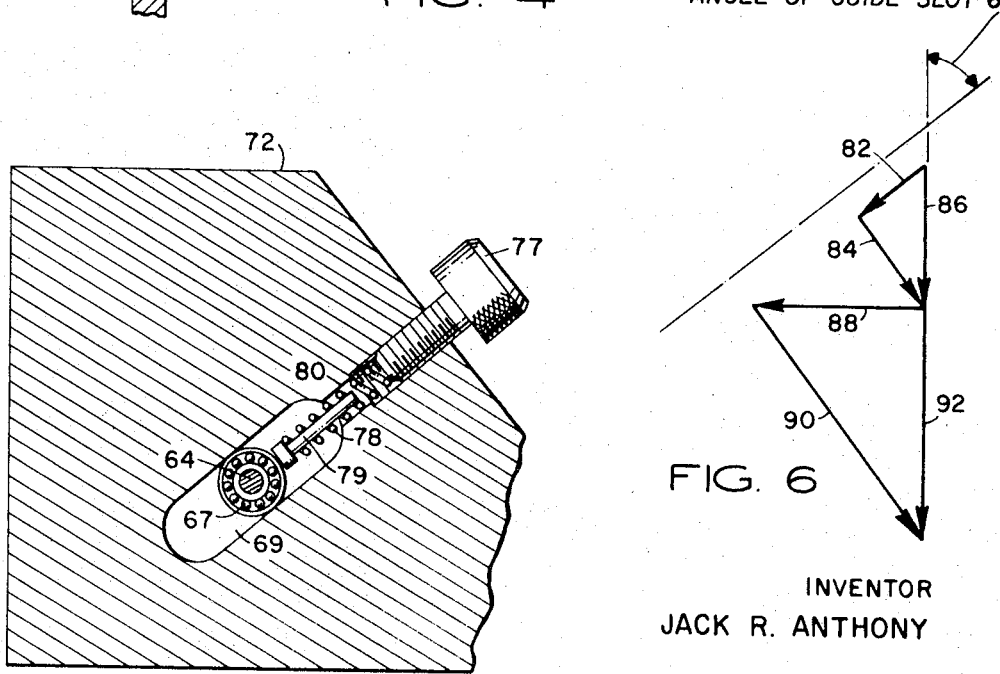
FIG. 5
FIG. 6
INVENTOR
JACK R. ANTHONY
Frank S. Troidl
ATTORNEY

TRANSPORT SYSTEM

BACKGROUND OF THE INVENTION

This invention relates to apparatus for accurately guiding and positioning continuous flexible webs of thin materials. More particularly, this invention is a new photosensitive medium transporting device for use with high speed data plotter systems.

Recently computers capable of handling vast quantities of data at extremely rapid rates have become available. Some of these computers use a laser light source modulated in intensity in accordance with the data received from the computer.

Since a laser light source modulated type system scans a photographic film at an extremely rapid rate, it is absolutely necessary that the photographic film transporting portion of this system move the photographic film past the scanning area at extremely rapid incremental indexed steps. These extremely rapid indexed steps must also be very accurate. As an example, the problem the present invention solves relates to the movement of photographic film in extremely accurate incremental indexed steps of .005 inch over long lengths of film. This indexing must be done while maintaining an accurate reference to the edge of the film for providing an accurately square plot.

SUMMARY OF THE INVENTION

The new transport system includes means for feeding a continuous flexible sheet of thin material to a rotatable member, such as a rotatable drum. Guide rollers are mounted with their axes of rotation nonparallel.

The angle of deviation of the axis of each of the guide rollers from the transverse of the material is carefully chosen so that each guide roller exerts a predetermined transverse force on the material as the material is moved toward the rotatable drum. The resulting equilibrium maintains the material along a true path without crimps or bends.

The new transport system also includes a means for applying a force at an angle to the direction of movement of the material on the rotatable drum. A preferred form of this means includes pressure rollers which are urged into frictional engagement with the film by compression springs.

The invention as well as its many advantages will be further understood by reference to the detailed description and drawings.

BRIEF DESCRIPTION OF THE DRAWINGS

FIG. 3 is a schematic top view of a portion of the film transport system;

FIG. 4 is a view partly in section illustrating the relative position of the pressure rollers with respect to the rotatable drum;

FIG. 5 is a sectional view showing the manner in which the predetermined angular pressure is applied against the pressure rollers; and FIG. 6 is a vector diagram useful in explaining the operation of the pressure rollers.

DESCRIPTION OF A PREFERRED EMBODIMENT

A high speed data plotter system with which the present inventive structure is uniquely adapted to operate includes a completely computer-controlled system wherein the plotter acts in an online capacity, plotting each line of image information while computing continues for subsequent lines. Additional information on such data plotter systems may be found in application Ser. No. 577,259, filed Sept. 6, 1966 now U.S. Pat. No. 3,389,403 for "Data Plotter" by Arnaldo Rolon et al. and application Ser. No. 631,269, filed Apr. 17, 1967 now U.S. Pat. No. 3,441,949 for "Data Plotter" in the name of Arnaldo Rolon, both applications assigned to the assignee of the present invention.

Figure 1:
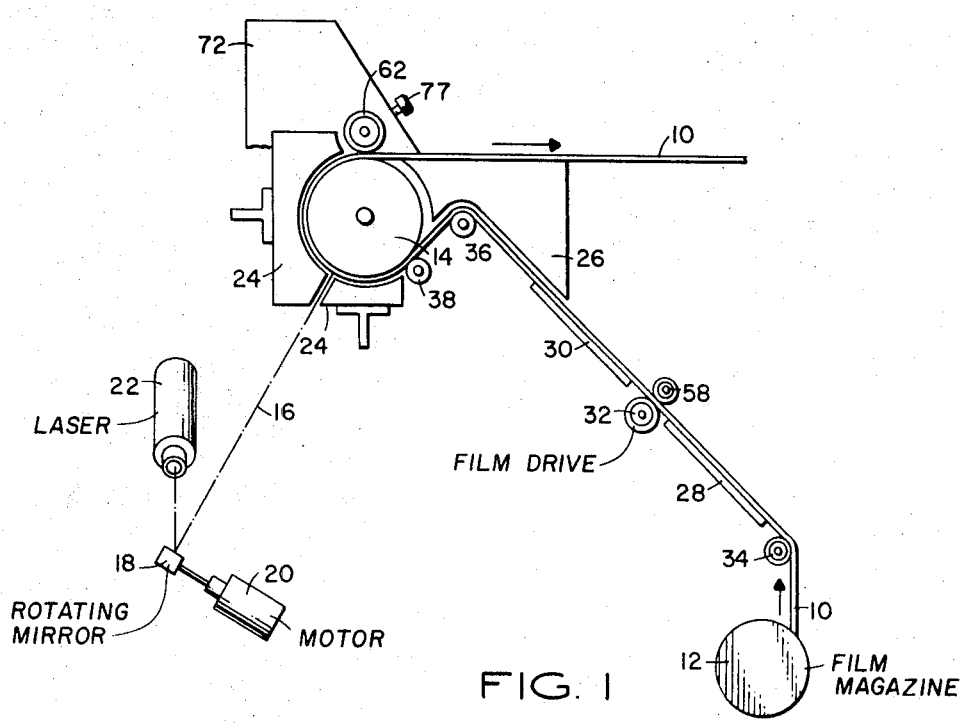
FIG. 1 is a schematic side view partly in section illustrating the relative positions of inventive features described herein.

Referring to the drawings and, more particularly, to FIG. 1, the photographic film 10 is fed from the magazine 12 to a rotatable drum 14. The photographic scanning of the photographic film 10 occurs while the film 10 is on the rotatable drum 14. A light beam is moved laterally across the width of the film 10 along a path shown by the broken line 16 in a direction perpendicular to the edge of the film 10 by a rotating mirror 18. The mirror 18 has a plurality of surfaces and is rotated by a suitable motor 20 to deflect the beam from a modulated laser light source 22 along the path 16.

The photographic film 10 is guided along a particular path and around at least a portion of the rotatable drum 14 by block member 24 and block member 26. After the film 10 is scanned by the laser beam 16, it is fed over the top of block member 26 and cut into desired portions of photographic film containing useful data.

The film transport system also includes a first flat plate 28 and a second flat plate 30 spaced from flat plate 28. A drive roller 32 is located in the space separating flat plate 28 and flat plate 30. In addition to the drive roller 32 rollers 34, 36 and 38 are provided along the path of the photographic film 10. These rollers help to drive the film 10 and are positioned so as to move the film 10 along a desired path.

Figure 2:
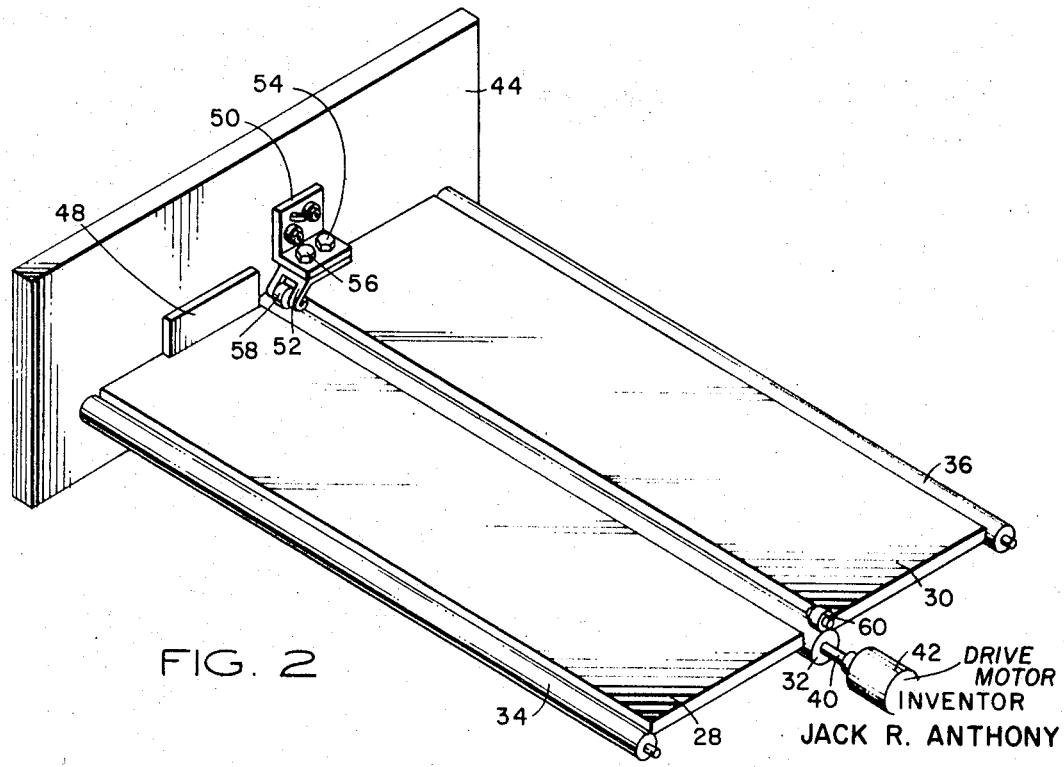
FIG. 2 is a perspective view illustrating the manner in which the guide rollers may be mounted in the system.

As shown in FIG. 2, the film drive roller 32 is connected by a shaft 40 to a drive motor 42. Drive motor 42 feeds the film to drum 14 at the rate required by the motion of drum 14.

As shown in FIG. 2 and FIG. 3, the new transport system is provided with a first side plate 44 and a second side plate 46 (see FIG. 3). A guide member 48 is connected to the first side plate 44 and also rests on the top of flat plate 28. The guide member 48 may be made of a plastic material such as the material identified by the DuPont trademark Delrin, which is a hard, stable, low friction material.

An L-shaped bracket 50 is mounted on the side plate 44. A spring 52 is connected to the horizontal portion of the L-shaped bracket 50 by the screws 54 and 56.

The spring 52 supports a guide roller 58 and also causes the guide roller 58 to frictionally engage the photographic film as the film is moved over the plates 28 and 30 by the drive roller 32.

A second guide roller 60 is similarly mounted on the plate 46 by means of an L-shaped bracket (not shown).

The screws 54 and 56 may be adjusted so that the axis of the guide roller 58 is moved to an angle of say 2° counterclockwise from the transverse of the photographic film 10 when the edge of the film 10 is parallel to the plates 44 and 46. Similarly the axis of the guide roller 60 may be adjusted to an angle of say 1° clockwise from the transverse of the film 10 when the edge of the film 10 is parallel to plates 44 and 46.

Rollers 58 and 60 and the drive roller 32 are preferably made of a high coefficient of friction material relative to the coefficient of friction of the photographic film to be handled.

The advantages of having the guide rollers 58 and 60 mounted at an angle to the transverse of film 10 may be understood by reference to the schematic showing of FIG. 3. Film 10 passes between drive roller 32 and the spring loaded guide rollers 58 and 60. Guide rollers 58 and 60 provide sufficient pressure between film 10 and drive roller 32 to insure positive film drive in the direction shown. Guide roller 58 is mounted so that its axis is maintained at a small angle, for example 2°, with respect to the axis of rotation of the drive roller 32. During the rolling action of roller 58 as the film 10 passes beneath the roller 58, the angle of the axis of rotation causes roller 58 to be urged away from the side plate 44. However, the roller 58 is rigidly mounted laterally and restrained from sidewise motion. The compliant frictional surface of roller 58 transfers this sidewise thrust to the moving film 10 urging the film toward side plate 44 until the left edge of the moving film contacts plastic film guide strip 48. Thereafter, a steady sidewise thrust maintains the left edge of film 10 in constant contact with strip 48, guiding the film in a true path according to the edge of the film in contact with strip 48 as is desired.

Guide roller 60 is similar to guide roller 58 and is mounted near the opposite edge of the film 10. The axis of rotation for guide roller 60 is adjusted to have a smaller angle, for example 1°, relative to the axis of rotation of drive roller 32. The axes of the guide rollers 58 and 60 are nonparallel. A similar sidewise thrust is developed by roller 60 during passage of the film, as described above for roller 58, except the sidewise thrust of roller 60 is less than for roller 58 and is opposite in direction, urging the right hand edge of film 10 toward side plate 46. The opposed sidewise forces applied near the edges of the film 10 result in lateral tensioning of the film along the surface of drive roller 32, insuring that film 10 will lie flat and true between guide rollers 58 and 60. Furthermore, the smaller sidewise force generated by roller 60 subtracts from the greater and opposite sidewise force of roller 58, leaving the constant difference in magnitude as effective to guide the left edge of film 10 steadily in contact with guide strip 48 with the desired net force.

As shown in FIG. 1 and FIG. 4, pressure rollers 62 and 63 are adapted to frictionally engage the photographic film 10 as the film is scanned and passed around rotatable drum 14.

In the embodiment shown, pressure rollers 62 and 63 are interconnected by shaft 64. A portion 65 of shaft 64 extends through pressure roller 62. A portion 66 of shaft 64 extends through pressure roller 63. Shaft portion 65 is supported by bearing 67; shaft portion 66 is supported by bearing 68. Bearings 67 and 68 are mounted in slots 69 and 70 formed in supports 72 and 74, respectively.

A drum drive motor 75 rotates drum 14. Motor 75 advances the film 10 in incremental rotary steps so that each successive line scan of light is made while the film is at rest and the film is advanced by the drum motion increment between each line scan interval.

Pressure rollers 62 and 63 are rotated by constant torque motor 76 coupled to the pressure roller shaft. If desired, the interconnecting shaft 64 can be eliminated thus providing two separated pressure rollers. Also, a single pressure roller may be substituted for pressure rollers 62 and 63 and the interconnecting shaft 64.

As shown in FIG. 5, the slot 69 has its major axis tilted a predetermined angle with respect to the direction of movement of the photographic film 10 on the rotatable drum 14. A screw 77 is threadedly mounted within the support 72. A compression spring 78 is located within the bore 80. Compression spring 78 has one end in contact with the end of the screw 76 and the other end in contact with the head of plunger 79. Plunger 79 is biased against bearing 67 by the compression spring. The bias of the compression spring 78 is adjusted by rotation of the screw 77 within bore 78. Though not shown, a similar bore, plunger, and screw adjusted compression spring are provided in support 74.

The operation of pressure rollers 62 and 63 on the film 10 may be understood by reference to FIG. 5 and FIG. 6. While at rest the force of spring 78, represented by vector 82, urges shaft 64 along the major axis of slot 69. Motion of shaft 64 is resisted by contact of pressure roller 62 with film 10 and rotatable drum 14, producing a reaction force from the upper edge of slot 69, represented by vector 84 reacting perpendicularly to the edge of slot 69. The resultant force of pressure roller 62, represented by vector 86, is applied downwardly against film 10 and rotatable drum 14, providing increased surface friction between film 10 and drum 14.

When drive power is applied to the mechanism to transport film 10, rotatable drum 14 is rotated clockwise (looking at FIG. 1) with the desired motion by drive motor 75 and an independently constant torque is applied to pressure roller 62 in a counterclockwise direction by motor 76. The compliant frictional surface of pressure roller 62 prevents it from slipping on the surface of film 10, and the lesser force from the counterclockwise torque of pressure roller 62 combines with the greater clockwise rotary force of rotatable drum 14, to drive film 10 at the exact circumferential speed of drum 14. The constant counterclockwise positive torque applied to pressure roller 62, attempts to increase rotary speed of pressure roller 62, which is prevented by the non slipping frictional contact of pressure roller 62 against film 10 whose motion is controlled by intimate frictional contact with drum 14. The resultant reaction force on shaft 64 due to the constant rotary torque applied to pressure roller 62, is represented by vector 88 and tends to urge shaft 64 to the left away from direction of film travel. Force vector 88 reacts against the upper edge of angled slot 69 generating a reaction force perpendicular to the edge of slot 69 and represented by vector 90. The resultant force of vector 88 and vector 90 is vector 92 which acts downwardly in addition to static force vector 86, greatly increasing the pressure urging pressure roller 62 against film 10 and drum 14, providing greatly increased frictional contact between film 10 and drum 14, forcing film 10 to exactly follow the surface of drum 14 whose motion dictates the desired positioning of film 10.

When power is removed from the mechanism and drive motion ceases, force vectors 88, 90 and 92 disappear and pressure roller 62 resumes the static pressure represented by vector 86 as previously explained. The static pressure of pressure roller 62 against film 10 and rotatable drum 14 is chosen so as not to produce a permanently deformed flat in the compliant surface of pressure roller 62 while at rest and not in use. When drive power is applied as described, the dynamic operation greatly increases the pressure roller pressure against film 10 and drum 14 to eliminate slippage between film 10 and drum 14 under all desired unidirectional drive motions. The combination of constant torque magnitude applied to pressure roller 62 and the choice of the angle of slot 69 permits the desired differential of static and dynamic pressures to be achieved.

It is important to realize that any wobble in the film will be reflected in the information recorded thereon. It must be remembered that the size of the laser beam is only .005 inch in diameter, and the slightest wobble in the film during a 40 inch sweep of such a small beam, would result in overlapping exposures of the film. This would create confusion and inaccuracies.

An illustrative example of photographic film for use with the data plotter described above is 42 inches in width and 100 feet in length. By providing a 1 inch margin along each edge of the film, the guide rollers 58 and 60 and pressure rollers 62 and 63 engage the film only in the margin. This leaves only the weight of the film resting on the rollers 34, 32, and 36.

My new transport system may be used for accurately guiding and positioning continuous flexible webs of thin materials other than photographic films. Illustrative examples of such materials are package wrapping films, foils, plastic sheet material and webs of paper.

It is to be understood that various modifications may be made to the described system without departing from the scope of the appended claims.

I claim:

1. In a high speed data plotter system using modulated laser light to scan photographic film:

a pair of spaced plates;

a rotatable drum;

photographic film drive means including a film drive roller in the space between the plates;

means for guiding the photographic film around at least a portion of the rotatable drum;

a first side plate;

a guide member connected to the first side plate;

a second side plate;

a guide roller adapted to frictionally engage the photographic film adjustably mounted on the first side plate and having an axis of rotation which deviates a predetermined angle from the axis of rotation of the film drive roller to exert a predetermined roller force on the photographic film;

a guide roller adapted to frictionally engage the photographic film adjustably mounted on the second side plate and having an axis of rotation which deviates a predetermined angle from the axis of rotation of the film drive roller to exert a predetermined roller force on the photographic film, said predetermined angle being less than the angle of deviation of the guide roller mounted on the first side plate, and the axes of the guide rollers being nonparallel;

a pair of supports adjacent the rotatable drum, each having a slot with its major axis tilted a predetermined angle with respect to the direction of movement of the photographic film on the rotatable drum;

pressure roller means adapted to frictionally engage the photographic film and having a shaft with one end extending into one slot and the other end extending into the other slot;

an adjustable screw threadedly mounted in each support; and a compression spring in each support, the bias of which is adjustable by rotation of the adjustable screw and adapted to bias the pressure roller shaft along the major axis of the slot.